United States Patent
Natarajan et al.

(10) Patent No.: US 10,601,872 B1
(45) Date of Patent: Mar. 24, 2020

(54) METHODS FOR ENHANCING ENFORCEMENT OF COMPLIANCE POLICIES BASED ON SECURITY VIOLATIONS AND DEVICES THEREOF

(71) Applicant: F5 Networks, Inc., Seattle, WA (US)

(72) Inventors: Ravi Natarajan, Fremont, CA (US); Saxon Amdahl, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 65 days.

(21) Appl. No.: 15/411,100

(22) Filed: Jan. 20, 2017

Related U.S. Application Data

(60) Provisional application No. 62/281,164, filed on Jan. 20, 2016.

(51) Int. Cl.
*H04L 29/06* (2006.01)
*H04W 12/08* (2009.01)

(52) U.S. Cl.
CPC ............ *H04L 63/20* (2013.01); *H04L 63/102* (2013.01); *H04W 12/08* (2013.01)

(58) Field of Classification Search
CPC ....... H04L 63/20; H04L 63/102; H04W 12/00
USPC ................................. 726/1, 26, 27
See application file for complete search history.

(56) References Cited

U.S. PATENT DOCUMENTS

| | | | |
|---|---|---|---|
| 5,946,388 A | 8/1999 | Walker et al. | |
| 7,023,979 B1 | 4/2006 | Wu et al. | |
| 7,065,203 B1 | 6/2006 | Huart et al. | |
| 7,607,164 B2 | 10/2009 | Vasishth et al. | |
| 7,624,422 B2 | 11/2009 | Williams et al. | |
| 7,627,891 B2 | 12/2009 | Williams et al. | |
| 8,069,483 B1 * | 11/2011 | Matlock | H04W 12/12 713/154 |
| 8,340,110 B2 | 12/2012 | Gast | |
| 8,499,331 B1 | 7/2013 | Yehuda et al. | |
| 8,522,306 B2 | 8/2013 | Lerner et al. | |
| 9,042,914 B2 * | 5/2015 | Harvey | H04L 63/107 455/456.3 |
| 9,338,176 B2 * | 5/2016 | Trumbull | G06F 21/552 |
| 9,349,015 B1 * | 5/2016 | Archer | G06F 21/60 |

(Continued)

OTHER PUBLICATIONS

Big-IP® Access Policy Manager®: Implementations, Version 12.0, F5 Networks, Inc., 2015, pp. 1-108.

(Continued)

*Primary Examiner* — Hosuk Song
(74) *Attorney, Agent, or Firm* — Pepper Hamilton LLP

(57) ABSTRACT

Methods, non-transitory computer readable media, and mobile application manager apparatus that assists with enhancing enforcement on compliance based on security violations includes obtaining security violation data associated with a plurality of enrolled mobile devices and identifying one or more of the plurality of enrolled mobile devices causing one or more security violations based on the obtained security violation data. One or more compliance policies are updated based on the obtained security violation data. A compliance check is performed on the identified one or more enrolled mobile devices causing the one or more security violations based on the updated one or more policies and initiating one or more compliance correction actions on the identified one or more enrolled mobile devices causing the one or more security violations.

16 Claims, 5 Drawing Sheets

(56) References Cited

U.S. PATENT DOCUMENTS

| | | | |
|---|---|---|---|
| 9,363,675 B2* | 6/2016 | Chuang | H04L 63/145 |
| 10,015,197 B2* | 7/2018 | Bai | H04L 63/20 |
| 2004/0193912 A1* | 9/2004 | Li | G06F 21/55 |
| | | | 726/14 |
| 2005/0138371 A1 | 6/2005 | Supramaniam et al. | |
| 2005/0204162 A1 | 9/2005 | Rayes et al. | |
| 2005/0273841 A1 | 12/2005 | Freund | |
| 2007/0143851 A1 | 6/2007 | Nicodemus et al. | |
| 2009/0254969 A1 | 10/2009 | Parker et al. | |
| 2010/0138921 A1 | 6/2010 | Na et al. | |
| 2010/0161773 A1 | 6/2010 | Prahlad et al. | |
| 2012/0005347 A1 | 6/2012 | Chen et al. | |
| 2012/0023190 A1 | 6/2012 | Backholm et al. | |
| 2014/0006772 A1 | 1/2014 | Qureshi et al. | |
| 2014/0189804 A1 | 6/2014 | Lehmann et al. | |
| 2014/0337607 A1 | 11/2014 | Peterson et al. | |
| 2015/0241941 A1 | 8/2015 | Luna et al. | |
| 2016/0088475 A1 | 3/2016 | Zhang | |
| 2016/0226913 A1 | 8/2016 | Sood et al. | |

OTHER PUBLICATIONS

Big-IP® Analytics: Implementations, version 12.0, Sep. 1, 2015, F5 Networks, Inc., pp. 1-50.

Big-IP® Application Security Manager™: Implementations, Version 12.0, F5 Networks, Inc., 2015-2016, pp. 1-352.

F5 Networks, Inc., "Big-IP APM", Release Notes, Aug. 9, 2016, pp. 1-9, version 11.6.1, F5 Networks, Inc.

F5 Networks, Inc., "Big-IP APM 11.4.1", Release Notes, Nov. 7, 2014, Version 11.4.1.

F5 Networks, Inc., "Big-IP® Access Policy Manager® Authentication Configuration Guide", Manual, Sep. 17, 2013, pp. 1-201, Version 11.4.

F5 Networks, Inc., "Big-IP® Access Policy Manager®: Application Access Guide", Manual, Jun. 11, 2013, pp. 1-26, Version 11.4.

F5 Networks, Inc., "Big-IP® Access Policy Manager®: Application Access", Manual, Aug. 25, 2014, pp. 1-50, version 11.6, F5 Networks, Inc.

F5 Networks, Inc., "Big-IP® Access Policy Manager®: Authentication and Single Sign-On", Manual, Aug. 25, 2014, pp. 1-308, version 11.6, F5 Networks, Inc.

F5 Networks, Inc., "Big-IP® Access Policy Manager®: Edge Client® and Application Configuration", Manual, Aug. 25, 2014, pp. 1-66, version 11.6, F5 Networks, Inc.

F5 Networks, Inc., "Big-IP® Access Policy Manager®: Implementations", Manual, Aug. 25, 2014, pp. 1-98, version 11.6, F5 Networks, Inc.

F5 Networks, Inc., "Big-IP® Access Policy Manager®: Secure Web Gateway Implementations", Manual, Aug. 25, 2014, pp. 1-160, version 11.6, F5 Networks, Inc.

F5 Networks, Inc., "Configuration Guide for Big-IP® Access Policy Manager®", Manual, Sep. 30, 2013, pp. 1-369, Version 11.4.

F5 Networks, Inc., "F5 Big-IP Access Policy Management Operations Guide", Manual, May 5, 2015, pp. 1-168.

F5 Networks, Inc., "BIG-IP® Access Policy Manager® Network Access Configuration", Manual, Sep. 17, 2013, pp. 1-72, Version 11.4.

\* cited by examiner

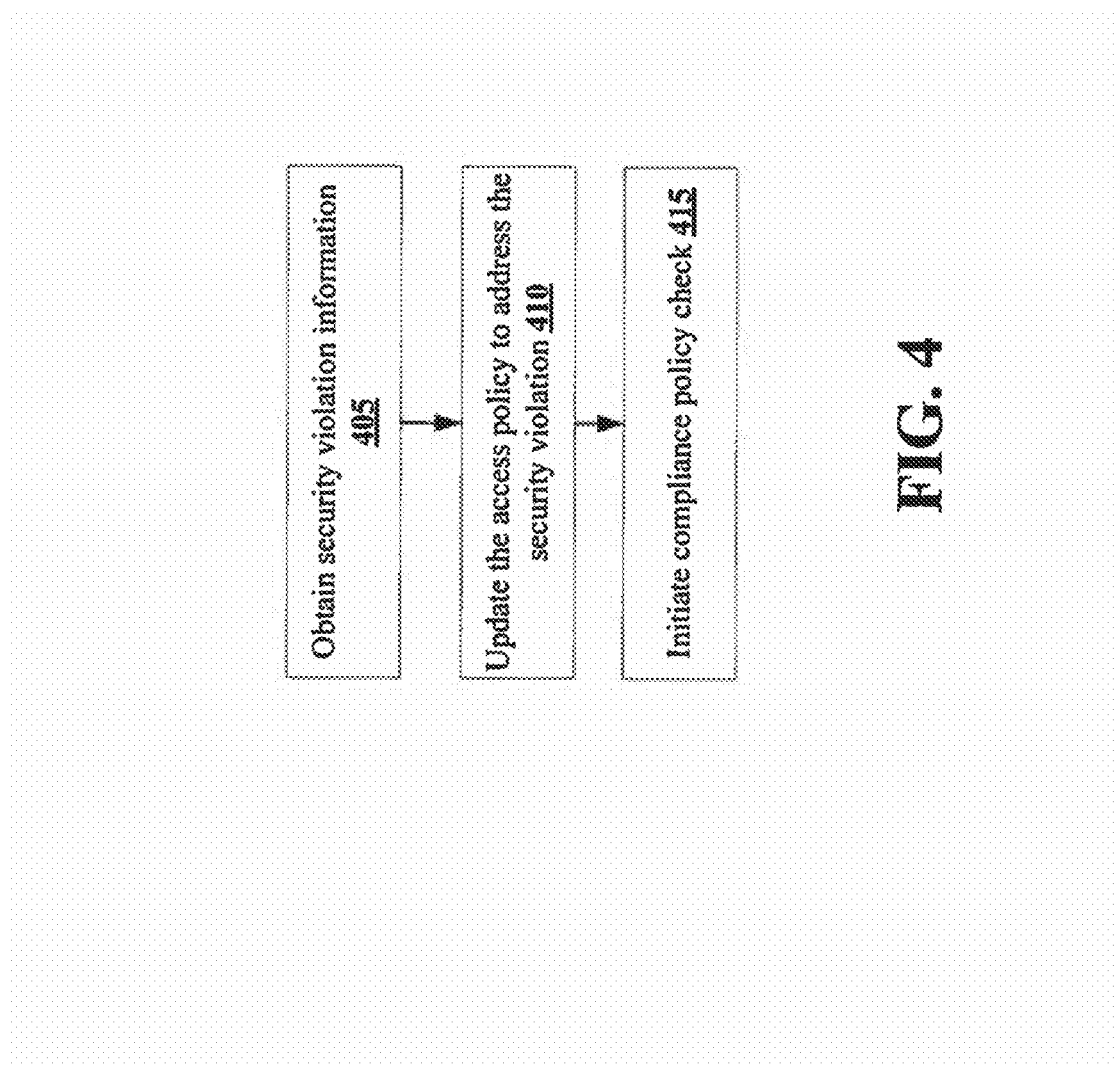

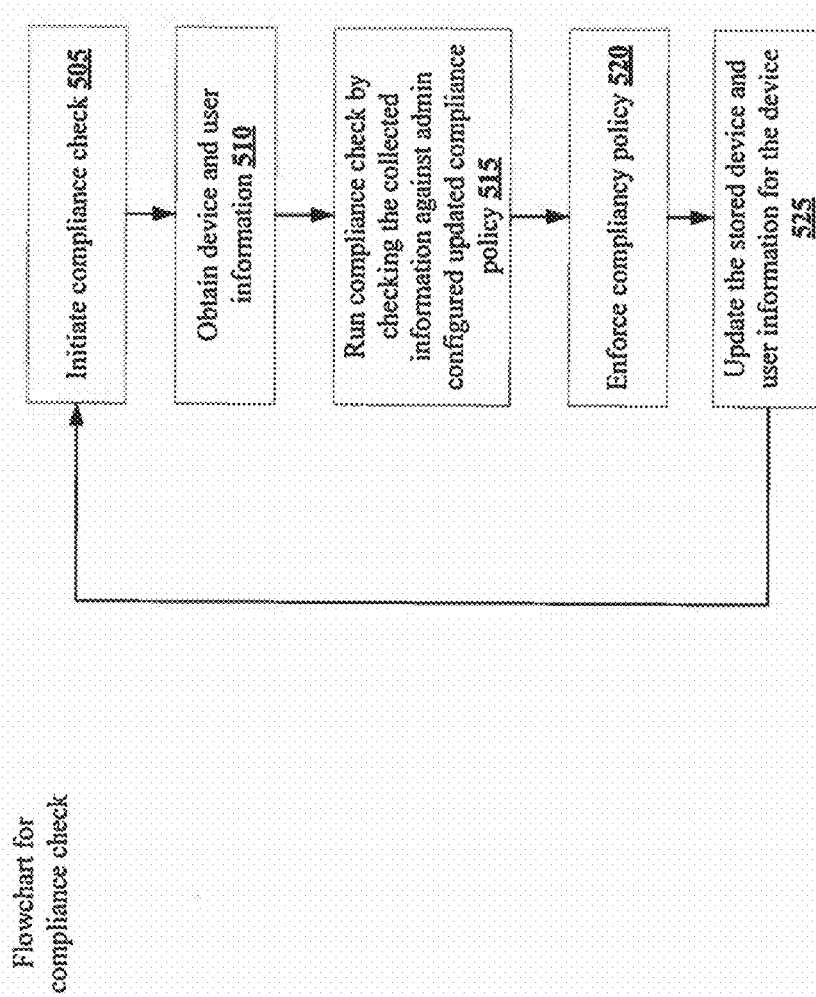

US 10,601,872 B1

METHODS FOR ENHANCING ENFORCEMENT OF COMPLIANCE POLICIES BASED ON SECURITY VIOLATIONS AND DEVICES THEREOF

This application claims the benefit of U.S. Provisional Patent Application Ser. No. 62/281,164, filed Jan. 20, 2016 which is hereby incorporated by reference in its entirety.

FIELD

This technology generally relates to methods and devices for network traffic management and, more particularly, to methods for enhancing enforcement of compliance policies based on security violations.

BACKGROUND

Periodic compliance policy checks are enforced on mobile devices for the purpose of providing access to protected web applications hosted on a server. The compliance checks include adding/deleting mobile applications and security policies on the mobile devices based on administrator configured compliance policy. Existing technologies primarily use the user or group details and the device status/configuration to define the compliance policies and enforce security constrains on the mobile devices. Additionally, the security violations detected during the enterprise resource access are used to block access to the protected resources. However, existing prior technologies have failed to use these security violations to enhance enforcement of subsequent compliance policies.

SUMMARY

A method for enhancing enforcement of compliance policies based on security violations by a network traffic management system comprising one or more network traffic apparatuses, client devices, or server devices includes obtaining security violation data associated with a plurality of enrolled mobile devices and identifying one or more of the plurality of enrolled mobile devices causing one or more security violations based on the obtained security violation data. One or more compliance policies are updated based on the obtained security violation data. A compliance check is performed on the identified one or more enrolled mobile devices causing the one or more security violations based on the updated one or more policies and initiating one or more compliance correction actions on the identified one or more enrolled mobile devices causing the one or more security violations.

A non-transitory computer readable medium having stored thereon instructions for enhancing enforcement of compliance policies based on security violations comprising machine executable code which when executed by at least one processor, causes the processor to perform steps including obtaining security violation data associated with a plurality of enrolled mobile devices and identifying one or more of the plurality of enrolled mobile devices causing one or more security violations based on the obtained security violation data. One or more compliance policies are updated based on the obtained security violation data. A compliance check is performed on the identified one or more enrolled mobile devices causing the one or more security violations based on the updated one or more policies and initiating one or more compliance correction actions on the identified one or more enrolled mobile devices causing the one or more security violations.

A mobile application manager apparatus including one or more processors coupled to a memory and configured to be capable of executing programmed instructions comprising and stored in the memory to obtain security violation data associated with a plurality of enrolled mobile devices and identifying one or more of the plurality of enrolled mobile devices causing one or more security violations based on the obtained security violation data. One or more compliance policies are updated based on the obtained security violation data. A compliance check is performed on the identified one or more enrolled mobile devices causing the one or more security violations based on the updated one or more policies and initiating one or more compliance correction actions on the identified one or more enrolled mobile devices causing the one or more security violations.

This technology provides a number of advantages including providing methods, non-transitory computer readable media and apparatuses that effectively assist with enhancing enforcement of compliance policies based on security violations. The disclosed technology uses the violation details to enhance compliance enforcement by uninstalling mobile applications or adding additional security profiles. Additionally, with the disclosed technology remediation actions, such as revoking certificates to disallow, are also taken on the mobile device causing the security violations.

BRIEF DESCRIPTION OF THE DRAWINGS

FIG. 4 is an exemplary flowchart of a method for enhancing enforcement of compliance policies based on security violations; and FIG. 5 is an exemplary flowchart of a method for updated compliance policy check for the mobile device causing the security violation.

DETAILED DESCRIPTION

Figure 1:
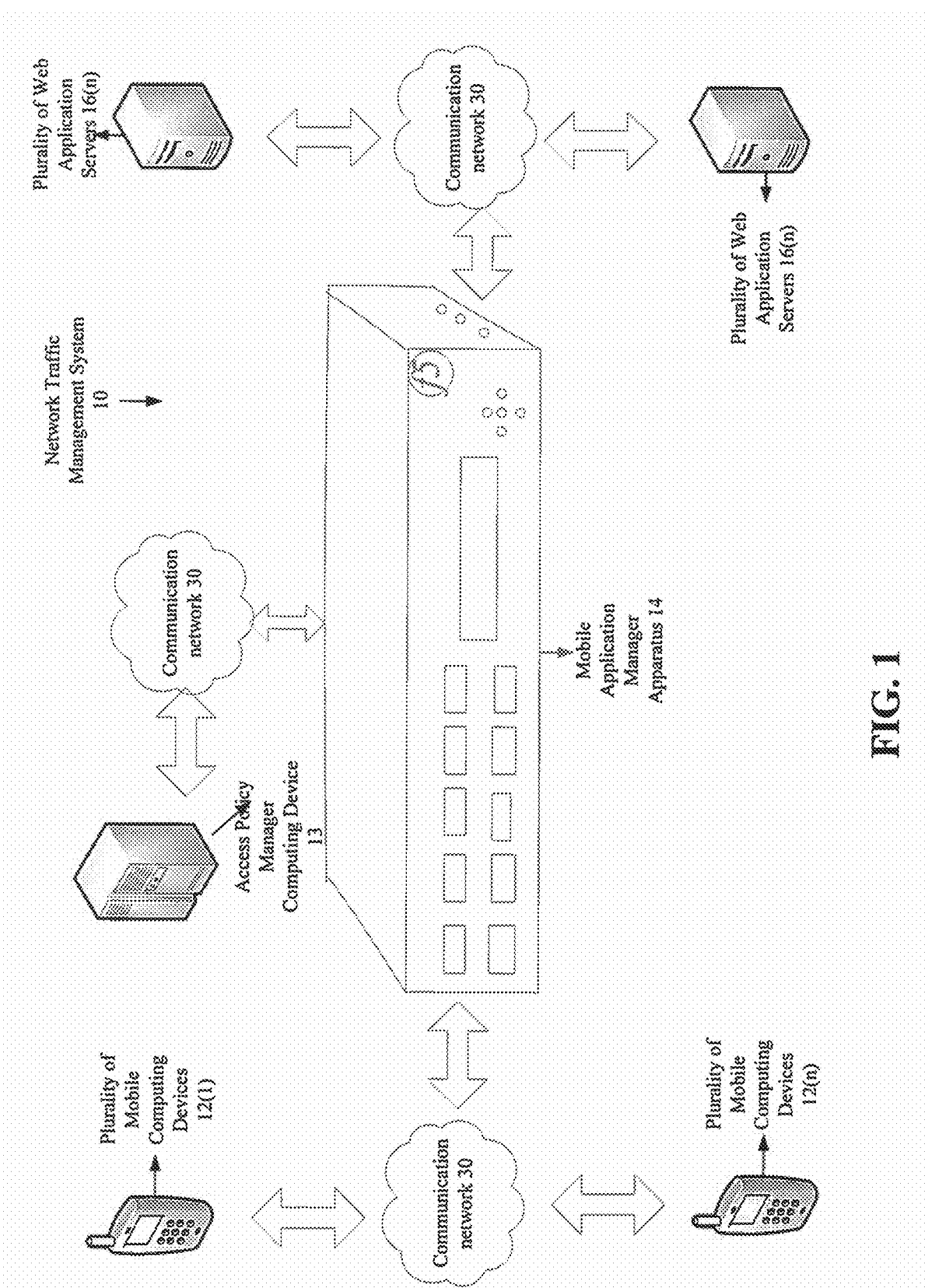
FIG. 1 is an example of a block diagram of an environment including a mobile application manager apparatus for enhancing enforcement of compliance policies based on security violations.
Figure 2:
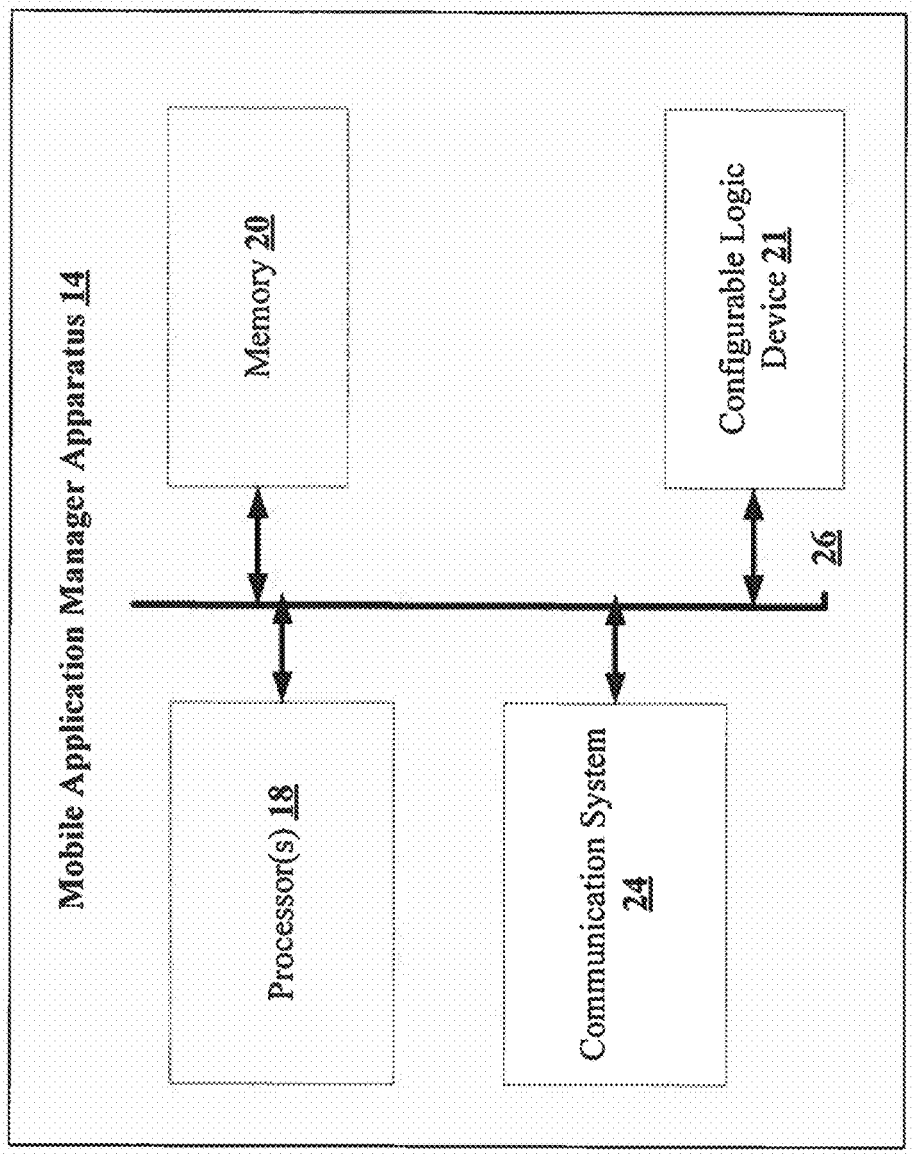
FIG. 2 is an example of a block diagram of the mobile application manager apparatus.

An example of a network environment 10 which incorporates a network traffic management system for enhancing enforcement of compliance policies based on security violations with the mobile application manager apparatus 14 is illustrated in FIGS. 1 and 2. The exemplary environment 10 includes a plurality of mobile computing devices 12(1)-12(n), an access policy manager computing device 13, a mobile application manager apparatus 14, and a plurality of web application servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including efficiently and effectively enhancing enforcement of compliance policies based on security violations.

Referring more specifically to FIGS. 1 and 2, mobile application manager apparatus 14 of network traffic management system is coupled to the plurality of mobile computing devices 12(1)-12(n) through the communication network 30, although the plurality of mobile computing devices 12(1)-12(n) and mobile application manager apparatus 14 may be coupled together via other topologies. Additionally, mobile application manager apparatus 14 is coupled to the plurality of web application servers 16(1)-16(n) through the communication network 30, although the web application servers 16(1)-16(n) and mobile application manager apparatus 14 may be coupled together via other topologies. Further, mobile application manager apparatus 14 is coupled to the access policy manager computing device 13 through the communication network 30, although the mobile application manager apparatus 14 and access policy manager computing device 13 may be coupled together via other topologies.

The mobile application manager apparatus 14 assists with enhancing enforcement of compliance policies based on security violations as illustrated and described by way of the examples herein, although mobile application manager apparatus 14 may perform other types and/or numbers of functions. As illustrated in FIG. 2, the mobile application manager apparatus 14 includes processor or central processing unit (CPU) 18, memory 20, optional configurable hardware logic 21, and a communication system 24 which are coupled together by a bus device 26 although the mobile application manager apparatus 14 may comprise other types and numbers of elements in other configurations. In this example, the bus 26 is a PCI Express bus in this example, although other bus types and links may be used.

The processors 18 within the mobile application manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
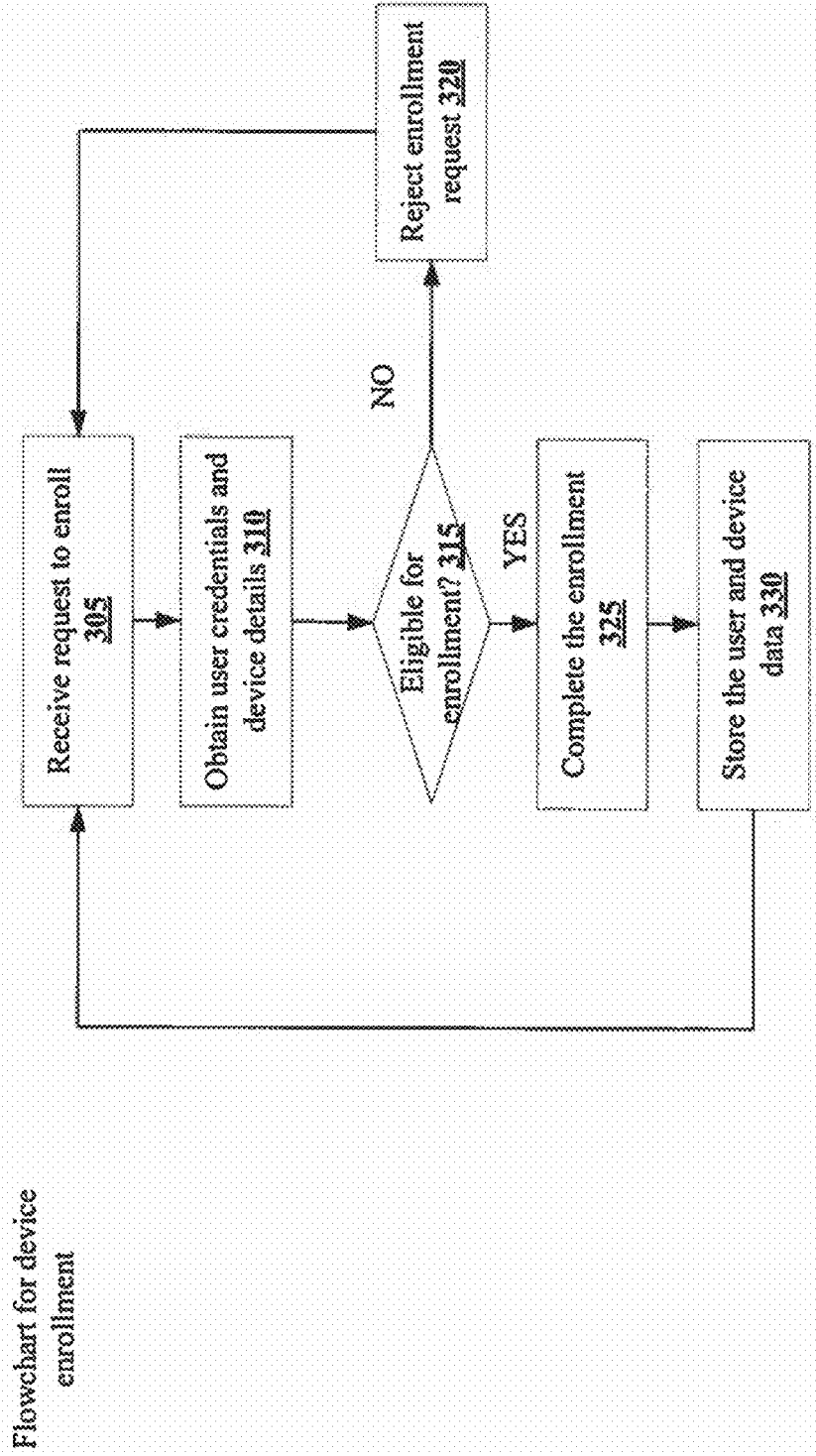
FIG. 3 is an exemplary flowchart of a method for method of enrolling a plurality of mobile devices using the mobile application manager apparatus.

The memory 20 within the mobile application manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIGS. 3-4 are representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Accordingly, the memory 20 of the mobile application manager apparatus 14 can store one or more applications that can include computer executable instructions that, when executed by the mobile application manager apparatus 14, causes the mobile application manager apparatus 14 to perform actions, such as to transmit, receive, or otherwise process messages, for example, and to perform other actions described and illustrated below with reference to FIGS. 3-5. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the mobile application manager apparatus 14 itself, may be located in virtual server(s) running in a cloud-based computing environment rather than being tied to one or more specific physical network computing devices. Also, the application(s) may be running in one or more virtual machines (VMs) executing on the mobile application manager apparatus 14. Additionally, in at least one of the various embodiments, virtual machine(s) running on the mobile application manager apparatus may be managed or supervised by a hypervisor.

The optional configurable hardware logic device 21 in the mobile application manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the mobile application manager apparatus 14 is used to operatively couple and communicate between the mobile application manager apparatus 14, the plurality of mobile computing devices 12(1)-12(n), the access policy manager computing device 13, and the web application servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of mobile computing devices 12(1)-12(n) of the network traffic management system, include a central processing unit (CPU) or processor, a memory, input/display device interface, configurable logic device and an input/output system or I/O system, which are coupled together by a bus or other link. The plurality of mobile computing devices 12(1)-12(n), in this example, may run interface applications, such as Web browsers, that may provide an interface to make requests for and send and/or receive data to and/or from the web application servers 16(1)-16(n) via the mobile application manager apparatus 14. Additionally, the plurality of mobile computing devices 12(1)-12(n) can include any type of computing device that can receive, render, and facilitate user interaction, such as client computers, network computer, mobile computers, virtual machines (including cloud-based computer), or the like. Each of the plurality of mobile computing devices 12(1)-12(n) utilizes the mobile application manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

The access policy manager computing device 13 of the network traffic management system include a central processing unit (CPU) or processor, a memory, and a communication system, which are coupled together by a bus or other link, although other numbers and/or types of network devices could be used. Generally, the access policy manager computing device 13 process requests for providing notification regarding security violation received from the mobile application manager apparatus 14, via the communication network 30 according to the HTTP-based application RFC protocol or the CIFS or NFS protocol in this example, but the principles discussed herein are not limited to this example and can include other application protocols. A series of applications may run on the access policy manager computing device 13 that allows the transmission of data requested by the mobile application manager apparatus 14. It is to be understood that the access policy manager computing device 13 may be hardware or software or may represent a system with multiple external resource servers, which may include internal or external networks. In this example the web application servers 16(1)-16(n) may be any version of Microsoft® IIS servers or Apache® servers, although other types of servers may be used.

Each of the plurality of web application servers 16(1)-16(n) of the network traffic management system include a central processing unit (CPU) or processor, a memory, and a communication system, which are coupled together by a bus or other link, although other numbers and/or types of network devices could be used. Generally, the plurality of web application servers 16(1)-16(n) process requests for providing access to one or more enterprise web applications received from the plurality of mobile computing devices 12(1)-12(n), mobile application manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of applications requested by the plurality of mobile computing devices 12(1)-12(n), or the mobile application manager apparatus 14. The plurality of web application servers 16(1)-16(n) may provide data or receive data in response to requests directed toward the respective applications on the plurality web application servers 16(1)-16(n) from the plurality of mobile computing devices 12(1)-12(n) or the mobile application manager apparatus 14. It is to be understood that the web application servers 16(1)-16(n) may be hardware or software or may represent a system with multiple external resource servers, which may include internal or external networks. In this example the plurality of web application servers 16(1)-16(n) may be any version of Microsoft® IIS servers or Apache® servers, although other types of servers may be used.

Although the plurality of web application servers 16(1)-16(n) are illustrated as single servers, one or more actions of the access policy manager computing device 13 and each of the plurality of web application servers 16(1)-16(n) may be distributed across one or more distinct network computing devices. Moreover, the plurality of web application servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of web application servers 16(1)-16(n) operate to manage and/or otherwise coordinate operations of the other network computing devices. The plurality of web application servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the web application servers 16(1)-16(n) depicted in FIG. 1 can operate within mobile application manager apparatus 14 rather than as a standalone server communicating with mobile application manager apparatus 14 via the communication network(s) 30. In this example the web application servers 16(1)-16(n) operate within the memory 20 of the mobile application manager apparatus 14.

While mobile application manager apparatus 14 is illustrated in this example as including a single device, mobile application manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise mobile application manager apparatus 14 in other examples can be standalone devices or integrated with one or more other devices or applications, such as one of the access policy manager computing device 13, plurality of web application servers 16(1)-16(n) or, the mobile application manager apparatus 14, or applications coupled to the communication network(s), for example. Moreover, one or more of the devices of mobile application manager apparatus 14 in these examples can be in a same or a different communication network 30 including one or more public, private, or cloud networks, for example.

Although an exemplary network traffic management system 10 with the plurality of mobile computing devices 12(1)-12(n), the access policy manager computing device 13, the mobile application manager apparatus 14, and the web application servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as mobile application manager apparatus 14, plurality of mobile computing devices 12(1)-12(n), the access policy manager computing device 13 or the plurality of web application servers 16(1)-16(n), for example, may be configured to operate as virtual instances on the same physical machine. In other words, one or more of mobile application manager apparatus 14, the access policy manager computing device 13, plurality of mobile computing devices 12(1)-12(n), or plurality of web application servers 16(1)-16(n) illustrated in FIG. 1 may operate on the same physical device rather than as separate devices communicating through a network as depicted in FIG. 1. There may be more or fewer mobile computing devices 12(1)-12(n), access policy manager computing device 13, mobile application manager apparatus 14, or web application servers 16(1)-16(n) than depicted in FIG. 1. The plurality of mobile computing devices 12(1)-12(n), the access policy manager computing device 13, and/or the plurality of web application servers 16(1)-16(n) could be implemented as applications on mobile application manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for enhancing enforcement on compliance based on security violations will now be described with reference to FIGS. 1-5. First, the method for enrolling the plurality of mobile computing devices 12(1)-12(n) will now be illustrated with reference to FIG. 3.

In step 305, the mobile application manager apparatus 14 may receive a request to enroll from one of the plurality of mobile devices 12(1)-12(n), although the mobile application manager apparatus 14 can receive other types and/or numbers of requests from the plurality of mobile computing devices 12(1)-12(n).

In response to the received request next in step 310, the mobile application manager apparatus 14 obtains the user credentials of the user of the requesting one of the plurality of mobile devices 12(1)-12(n) as the enrollment information, although the mobile application manager apparatus 14 can receive other types and/or amounts of information from the requesting one of the plurality of mobile computing devices 12(1)-12(n), such as geographic location information, role of the user of the requesting one of the plurality of mobile computing devices 12(1)-12(n), IP address, type of the requesting device, current operating system on the mobile computing device, and/or installed mobile applications and security policies by way of example only.

Next in step 315, the mobile application manager apparatus 14 performs an authentication check based on the received information to determine whether to enroll the requesting one of the plurality of mobile computing devices 12(1)-12(n), although the mobile application manager apparatus 14 can perform the authentication check in other manners and/or using other types and/or amounts of information. In this example, the mobile application manager apparatus 14 compares the received information associated with the requesting one of the plurality of mobile computing devices 12(1)-12(n) against the existing access control checks to determine when to enroll the requesting one of the plurality of mobile computing devices 12(1)-12(n), although the mobile application manager apparatus 14 can perform the authentication checks using other techniques. By way of example, the mobile application manager apparatus 14 determines when to enroll the requesting one of the plurality of mobile devices 12(1)-12(n) based on the role of the user of the requesting mobile device, type of requesting one of the plurality of mobile devices 12(1)-12(n) or the type of operating system executing in the requesting one of the plurality of mobile devices 12(1)-12(n). Accordingly, when the mobile application manager apparatus 14 determines that the requesting one of the plurality of mobile devices 12(1)-12(n) should not be enrolled, then the No branch is taken to next step 320. In step 320, the mobile application manager apparatus 14 rejects the request for enrollment and the exemplary flow proceeds back to step 305.

However if back in step 315, when the mobile application manager apparatus 14 determines that the access should be provided to the requesting one of the plurality of mobile computing devices 12(1)-12(n), then the Yes branch is taken to next step 325. In step 325, the mobile application manager apparatus 14 completes the enrollment request by sending a confirmation back to the requesting one of the plurality of mobile devices 12(1)-12(n), although the mobile application manager apparatus 14 can complete the enrollment request using other techniques.

Next in step 330, the mobile application manager apparatus 14 stores the received enrollment information within the memory 20, although the mobile application manager apparatus 14 can store the registration information at other memory locations. Further, the mobile application manager apparatus 14 may store the information associated with the requesting one of the plurality of mobile computing devices 12(1)-12(n), such as the installed mobile applications and security policies by way of example, in a state table that includes a list of all enrolled devices, although the mobile application manager apparatus 14 can store the information at other memory locations.

An example of the method for enhancing enforcement of compliance policies based on security violations will now be illustrated with reference to FIG. 4. In step 405, the mobile application manager apparatus 14 obtains security violation information from the access policy manager computing device 13, although the mobile application manager apparatus 14 can receive the security violation information from other devices and/or locations. In this example, after completing the enrollment, the enrolled plurality of mobile devices 12(1)-12(n) access the web applications on the plurality of web servers 16(1)-16(n) via the access policy manager computing device 13, although the enrolled plurality of mobile devices 12(1)-12(n) can access the web applications via the mobile application manager apparatus 14 in other examples. While the enrolled plurality of mobile devices 12(1)-12(n) access the web application on the plurality of web application servers 16(1)-16(n), some of the enrolled plurality of mobile devices 12(1)-12(n) may obtain access or performing unauthorized changes to certain web applications for which they were initially not authorized to access or vice-versa, or include malicious mobile applications and these events are broadly classified as security violations in this example. By way of example, these security violations in this example can occur due to a change of geographical location of one or more of the enrolled mobile devices or a change of role of the user using one or more of the enrolled plurality of mobile devices, although the security violations can occur due to other types and/or number of changes or other factors. Accordingly, the security violation information obtained by the mobile application manager apparatus 14 from the access policy manager computing device 13 includes all of the information illustrated above in this step, although security violation information can include other types or amounts of information.

Next in step 410, the mobile application manager apparatus 14 updates the acces policy to address the security violation. In this example, the mobile application manager apparatus 14 by addressing the security violation can enhance compliance enforcement by uninstalling certain mobile applications or adding security profiles on the enrolled plurality of mobile devices 12(1)-12(n) causing the security violation, although other types and/or numbers of measures may be implemented. Additionally, the mobile application manager apparatus 14 can also perform remediation actions such as revoking certificates to disallow access to web applications on the enrolled plurality of mobile devices 12(1)-12(n) causing the security violations.

Next in step 415, the mobile application manager apparatus 14 initiates the updated compliance policy check for the mobile device causing the security violation which will further be illustrated with reference to FIG. 5, although the mobile application manager apparatus 14 can initiate the compliance policy check for all the plurality of mobile devices 12(1)-12(n) or a group of plurality of mobile devices 12(1)-12(n). In this example, the mobile application manager apparatus 14 performs the periodic compliance check using the updates that were performed to address the security violation.

In step 505, the mobile application manager apparatus 14 initiates the updated compliance check, although the mobile application manager apparatus 14 can start the updated compliance check based on other types or numbers of parameters.

Next in step 510, the mobile application manager apparatus 14 obtains the device information associated with all of the enrolled plurality of mobile devices 12(1)-12(n) and the user information associated with the enrolled plurality of mobile devices 12(1)-12(n), although the mobile application manager apparatus 14 can use other techniques to obtain the information.

In step 515, the mobile application manager apparatus 14 performs the compliance check by comparing the obtained device and user information against the updated compliance policy, although the mobile application manager apparatus 14 can perform the compliance check using other techniques. By performing the updated compliance check, the mobile application manager apparatus 14 is able to identify the enrolled plurality of mobile devices 12(1)-12(n) that are deviating from the compliance policy. Optionally, the mobile application manager apparatus 14 can perform the compliance policy check by querying an active directory to receive and process the information associated with the enrolled plurality of mobile devices 12(1)-12(n), such as a user's role, a user's group, and/or other types of data associated with the user's of the enrolled plurality of mobile devices 12(1)-12(n), by way of example only.

Next in step 520, the mobile application manager apparatus 14 enforces the updated compliance policies on the enrolled plurality of mobile devices 12(1)-12(n) deviating from the compliance policies identified from step 515, although the mobile application manager apparatus 14 can enforce the compliance policies on all of the enrolled plurality of mobile devices 12(1)-12(n).

Next in step 525, the mobile application manager apparatus 14 updates the user and device information stored in the memory 20 of the mobile application manager apparatus 14 based on the updated compliance policies that were enforced back in step 520. In this example, the mobile application manager apparatus 14 updates all the information associated with the user and the device, although other types and/or amounts of information could be updated. Additionally, the mobile application manager apparatus 14 also marks the plurality of mobile devices 12(1)-12(n) as compliant or non-compliant devices, in this example.

Accordingly as illustrated and described by way of the examples herein, this technology effectively assists with enhancing enforcement of compliance policies based on security violations. The disclosed technology uses the violation details to enhance compliance enforcement by uninstalling mobile applications or adding additional security profiles. Additionally, with the disclosed technology remediation actions, such as revoking certificates to disallow, are also taken on the mobile device causing the security violations.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for enhancing enforcement on compliance based on security violations implemented by a network traffic management system comprising one or more network traffic apparatuses, client devices, or server devices, the method comprising:

obtaining security violation data associated with a plurality of enrolled mobile devices and identifying one or more of the plurality of enrolled mobile devices causing one or more security violations based on the obtained security violation data;

updating one or more compliance policies based on the obtained security violation data; and performing a compliance check on the identified one or more enrolled mobile devices causing the one or more security violations based on the updated one or more compliance policies and initiating one or more compliance correction actions on the identified one or more enrolled mobile devices causing the one or more security violations, wherein the one or more compliance correction actions further comprises adding one or more security profiles to the identified one or more enrolled mobile devices causing the one or more security violations.

2. The method as set forth in claim 1 wherein the security violation data is obtained from an access policy manager computing device.

3. The method as set forth in claim 1 wherein the one or more compliance correction actions further comprises revoking a device certificate to the identified one or more enrolled mobile devices causing the one or more security violations to disallow access to a plurality of web applications on the web application servers.

4. The method as set forth in claim 1 wherein the one or more compliance correction actions further comprises installing or uninstalling one or more mobile applications in the identified one or more enrolled mobile devices causing the one or more security violations.

5. A non-transitory computer readable medium having stored thereon instructions for enhancing enforcement on compliance based on security violations comprising executable code which when executed by one or more processors, causes the processors to:

obtain security violation data associated with a plurality of enrolled mobile devices and identifying one or more of the plurality of enrolled mobile devices causing one or more security violations based on the obtained security violation data;

update one or more compliance policies based on the obtained security violation data; and perform a compliance check on the identified one or more enrolled mobile devices causing the one or more security violations based on the updated one or more compliance policies and initiating one or more compliance correction actions on the identified one or more enrolled mobile devices causing the one or more security violations, wherein the one or more compliance correction actions further comprises adding one or more security profiles to the identified one or more enrolled mobile devices causing the one or more security violations.

6. The medium as set forth in claim 5 wherein the security violation data is obtained from an access policy manager computing device.

7. The medium as set forth in claim 5 wherein the one or more compliance correction actions further comprises revoking a device certificate to the identified one or more enrolled mobile devices causing the one or more security violations to disallow access to a plurality of web applications on the web application servers.

8. The medium as set forth in claim 5 wherein the one or more compliance correction actions further comprises installing or uninstalling one or more mobile applications in the identified one or more enrolled mobile devices causing the one or more security violations.

9. A mobile application manager apparatus, comprising memory comprising programmed instructions stored in the memory and one or more processors configured to be capable of executing the programmed instructions stored in the memory to:

obtain security violation data associated with a plurality of enrolled mobile devices and identifying one or more of the plurality of enrolled mobile devices causing one or more security violations based on the obtained security violation data;

update one or more compliance policies based on the obtained security violation data; and perform a compliance check on the identified one or more enrolled mobile devices causing the one or more security violations based on the updated one or more compliance policies and initiating one or more compliance correction actions on the identified one or more enrolled mobile devices causing the one or more security violations, wherein the one or more compliance correction actions further comprises installing or uninstalling one or more mobile applications in the identified one or more enrolled mobile devices causing the one or more security violations.

10. The device as set forth in claim 9 wherein the security violation data is obtained from an access policy manager computing device.

11. The device as set forth in claim 9 wherein the one or more compliance correction actions further comprises revoking a device certificate to the identified one or more enrolled mobile devices causing the one or more security violations to disallow access to a plurality of web applications on the web application servers.

12. The device as set forth in claim 9 wherein the one or more compliance correction actions further comprises installing or uninstalling one or more mobile applications in the identified one or more enrolled mobile devices causing the one or more security violations.

13. A network traffic management system, comprising one or more traffic management apparatuses, client devices, or server devices, the network traffic management system comprising memory comprising programmed instructions stored thereon and one or more processors configured to be capable of executing the stored programmed instructions to:

obtain security violation data associated with a plurality of enrolled mobile devices and identifying one or more of the plurality of enrolled mobile devices causing one or more security violations based on the obtained security violation data;

update one or more compliance policies based on the obtained security violation data; and perform a compliance check on the identified one or more enrolled mobile devices causing the one or more security violations based on the updated one or more compliance policies and initiating one or more compliance correction actions on the identified one or more enrolled mobile devices causing the one or more security violations, wherein the one or more compliance correction actions further comprises adding one or more security profiles to the identified one or more enrolled mobile devices causing the one or more security violations.

14. The network traffic management system of claim 13, wherein the security violation data is obtained from an access policy manager computing device.

15. The network traffic management system of claim 13 wherein the one or more compliance correction actions further comprises revoking a device certificate to the identified one or more enrolled mobile devices causing the one or more security violations to disallow access to a plurality of web applications on the web application servers.

16. The network traffic management system of claim 13 wherein the one or more compliance correction actions further comprises installing or uninstalling one or more mobile applications in the identified one or more enrolled mobile devices causing the one or more security violations.

\* \* \* \* \*